United States Patent [19]

Miyamoto et al.

[11] Patent Number: 4,722,004
[45] Date of Patent: Jan. 26, 1988

[54] VIDEO SIGNAL DISCRIMINATING APPARATUS

[75] Inventors: Fumitaka Miyamoto, Yachiyo; Kenji Kaneko, Iwai, both of Japan

[73] Assignee: Victor Company of Japan, Ltd., Yokohama, Japan

[21] Appl. No.: 934,738

[22] Filed: Nov. 25, 1986

[30] Foreign Application Priority Data

Nov. 27, 1985 [JP] Japan ................................. 60-266619
Jan. 20, 1986 [JP] Japan ..................................... 61-9691

[51] Int. Cl.$^4$ ......................... H04N 17/00; H04N 5/08
[52] U.S. Cl. .................................... 358/139; 358/153; 328/139; 307/231
[58] Field of Search ...................... 358/139, 148, 21 V, 358/153, 154; 328/111, 139; 307/231, 518, 526, 234, 356, 358

[56] References Cited

U.S. PATENT DOCUMENTS

| | | | |
|---|---|---|---|
| 4,112,317 | 9/1978 | Everswick | 307/234 |
| 4,334,243 | 6/1982 | Srivastava | 358/153 |
| 4,511,920 | 4/1985 | Iijima et al. | 358/139 |
| 4,675,597 | 6/1987 | Hernández | 328/111 |
| 4,683,495 | 7/1987 | Brock | 307/518 |

Primary Examiner—Howard W. Britton
Assistant Examiner—John K. Peng
Attorney, Agent, or Firm—Michael N. Meller

[57] ABSTRACT

A video signal discriminating apparatus comprises a pulse width measuring part for measuring a pulse width of a vertical or horizontal synchronizing pulse within a composite synchronizing signal of a video signal, a period measuring part for measuring a period of the synchronizing pulse having the pulse width thereof measured in the pulse width measuring part, and a discriminating part for discriminating that the video signal exists when the measured pulse width and the measured period are within respective predetermined ranges and for discriminating that no video signal exists when the measured pulse width and the measured period are outside the respective predetermined ranges.

12 Claims, 9 Drawing Figures

VIDEO SIGNAL DISCRIMINATING APPARATUS

BACKGROUND OF THE INVENTION

The present invention generally relates to video signal discriminating apparatuses, and more particularly to a video signal discriminating apparatus for discriminating whether or not a video signal exists.

A video signal superimposing circuit is conventionally used to carry out a superimposed display on a television receiver, for example. The video signal superimposing circuit is supplied with a main video signal received from a television broadcasting station, for example, and a sub video signal received from a personal computer which is synchronized to the main video signal, for example. The video signal superimposing circuit outputs a superimposed video signal by replacing the main video signal by the sub video signal only during a time period in which the sub video signal is related to sub information such as characters, figures and the like.

When carrying out such a superimposed display, the sub video signal is constantly obtained from the personal computer. On the other hand, no main video signal is obtained when the receiving channel of the television receiver is changed to an unused channel in which no broadcasting is made. In addition, in the case where a video tape recorder is used instead of the television receiver, no main video signal is obtained when an operating mode of the video tape recorder is set to a stop mode.

Since the superimposed video signal comprises the main video signal and the sub video signal only during the time period in which the sub video signal relates to the sub information, a composite synchronizing signal of the superimposed video signal is obtained from the main video signal. Accordingly, no composite synchronizing signal exists in the superimposed video signal when no main video signal is obtained, and in this case, a reproduced picture obtained from the superimposed video signal becomes abnormal.

Accordingly, a video signal discriminating circuit for discriminating whether or not a video signal exists was previously proposed in a Japanese patent application No. 59-209317 filed Oct. 5, 1984 in which the applicant is the same as the assignee of the present application. According to the previously proposed video signal discriminating circuit, a discrimination is carried out to determine whether or not the main video signal exists based on a counted value which is obtained by counting pulses in the main video signal during a time period in which a vertical synchronizing pulse of the main video signal exists.

However, since the previously proposed video signal discriminating circuit simply counts the pulses in the main video signal during the time period in which the vertical synchronizing pulse exists, the discrimination cannot be carried out with a satisfactory accuracy. In addition, in the case where a signal-to-noise ratio of the main video signal becomes deteriorated, there is a problem in that the discrimination accuracy becomes poor. Furthermore, there is a problem in that a sub video signal which is constantly in stable synchronism with the main video signal is required to detect the time period in which vertical synchronizing pulse of the main video signal exists.

SUMMARY OF THE INVENTION

Accordingly, it is a general object of the present invention to provide a novel and useful video signal discriminating apparatus in which the problems described heretofore are eliminated.

Another and more specific object of the present invention is to provide a video signal discriminating apparatus comprising pulse width measuring means for measuring a pulse width of a vertical or horizontal synchronizing pulse within a composite synchronizing signal of a video signal, period measuring means for measuring a period of the synchronizing pulse having the pulse width thereof measured in the pulse width measuring means, and discriminating means for discriminating that the video signal exists when the measured pulse width and the measured period are within respective predetermined ranges and for discriminating that no video signal exists when the measured pulse width and the measured period are outside the respective predetermined ranges. The video signal discriminating apparatus according to the present invention is especially suited for use in a video signal superimposing circuit. According to the video signal discriminating apparatus of the present invention, the accuracy with which the existence of the video signal is discriminated is improved, and it is possibel to carry out an accurate discrimination even when a signal-to-noise ratio of the video signal becomes deteriorated. Furthermore, there is no need to use a sub video signal for the discrimination.

Other objects and further features of the present invention will be apparent from the following detailed description when read in conjunction with the accompanying drawings.

DETAILED DESCRIPTION

Figure 1:
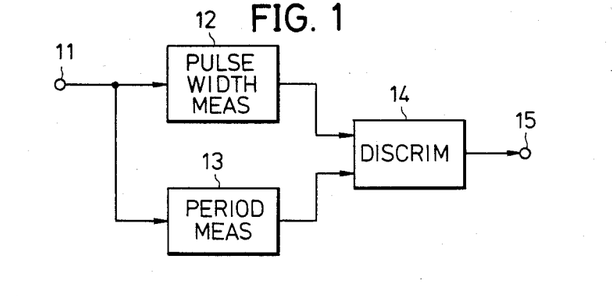
FIG. 1 is a a system block diagram showing a first embodiment of the video signal discriminating apparatus according to the present invention.
Figure 2:
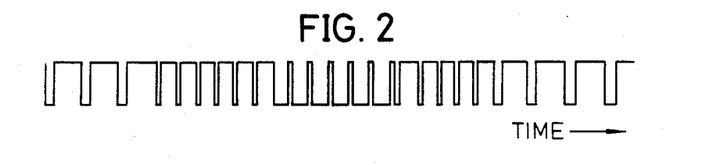
FIG. 2 shows the signal waveform of a composite synchronizing signal.

FIG. 1 shows a first embodiment of the video signal discriminating apparatus according to the present invention. In FIG. 1, a composite synchronizing signal of a video signal is applied to an input terminal 11 and is supplied to pulse width measuring means 12 and to period measuring means 13. The composite synchronizing signal is shown in FIG. 2, and this composite synchronizing signal may be separated by known means (not shown) from a video signal received in a television receiver (not shown) or reproduced on a video tape recorder (not shown), for example. The pulse width measuring means 12 measures the pulse width of a vertical or horizontal synchronizing pulse within the composite video signal. The period measuring means 13 measures the period of the synchronizing pulse having the pulse width thereof measured in the pulse width measuring means 12. The measured pulse width and the measured period are supplied to discriminating means 14. The discriminating means 14 produces a signal indicating that the video signal exists when the measured pulse width and the measured period are with respective predetermined ranges. On the other hand, the discriminating means 14 produces a signal indicating that no video signal exists when the measured pulse width and the measured period are outside the respective predetermined ranges.

According to the present embodiment, the existence of the video signal can be discriminated with an improved accuracy because the discrimination is carried out by determining whether or not the pulse width and the period of the vertical or horizontal synchronizing pulse are within the respective predetermined ranges.

Figures 3, 5, 8:
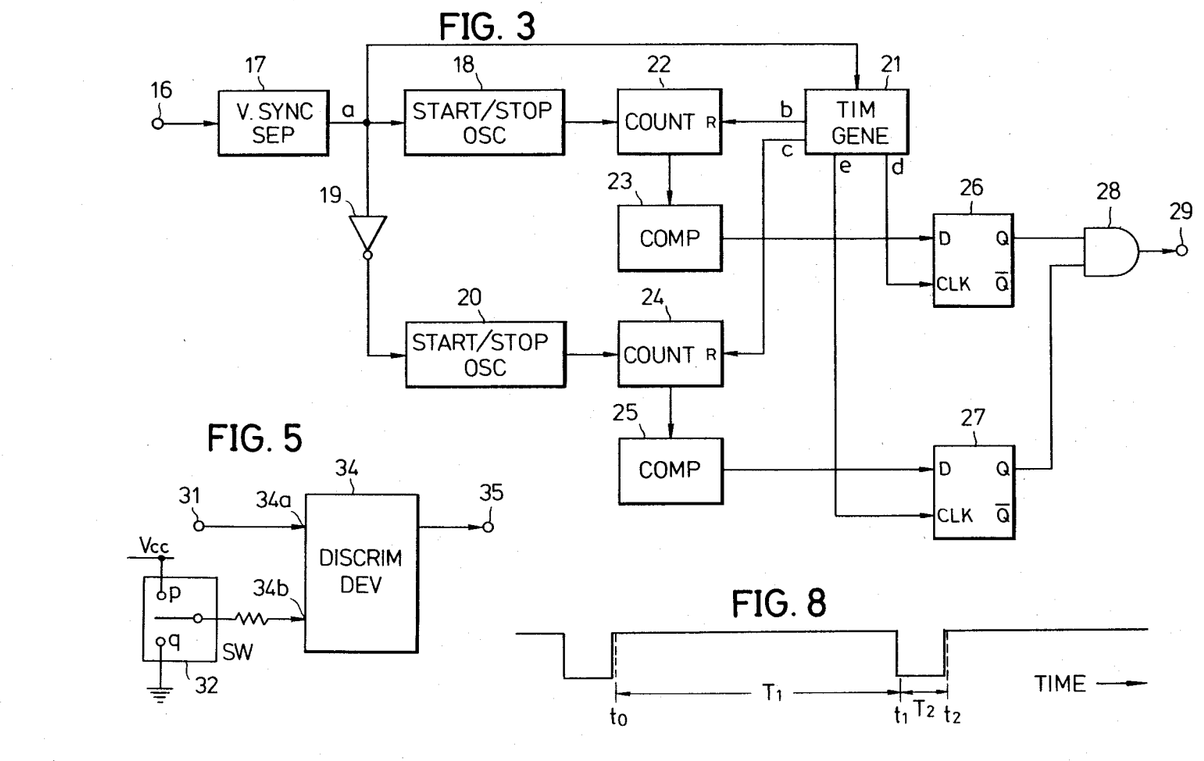
FIG. 3 is a system block diagram showing an embodiment of the concrete construction of the first embodiment.
FIG. 5 is a system block diagram showing a second embodiment ofthe video signal discriminating apparatus according to the present invention.
FIG. 8 shows a vertical synchronizing signal within a composite synchronizing signal.
Figure 4:
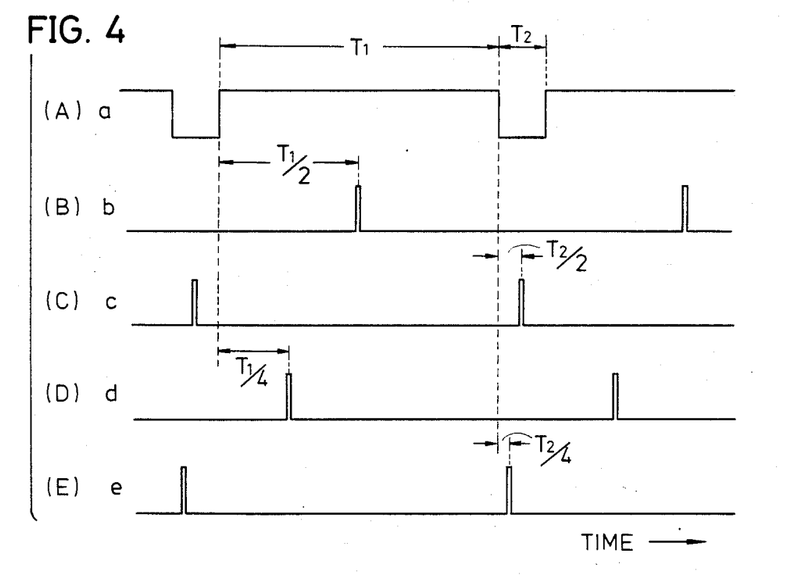
FIGS. 4(A) through 4(E) are time charts for explaning the operation of the block system shown in FIG. 3.

FIG. 3 shows an embodiment of the concrete construction of the block system shown in FIG. 1. The composite synchronizing signal is applied to an input terminal 16 and is supplied to a known vertical synchronizing signal separating circuit 17 which separates a vertical synchronizing signal a shown in FIG. 4(A) from the composite synchronizing signal. The separated vertical synchronizing signal a is supplied to a start/stop oscillator 18, to a start/stop oscillator 20 via an inverter 19, and to a timing generator 21 which will be described later. The start/stop oscillators 18 and 20 are designed to start an oscillation responsive to a low-level input signal and to stop the oscillation responsive to a high-level input signal. For example, the oscillation frequencies of the start/stop oscillators 18 and 20 are 1 MHz and 10 kHz, respectively.

A counter 22 counts output pulses of the start/stop oscillator 18 and supplies a counted value to a comparator 23. The comparator 23 determines through comparison whether or not the counted value from the counter 22 corresponds to a value within a range from 150 μsec to 200 μsec, and produces a high-level signal when the counted value corresponds to the value within the range from 150 μsec to 200 μsec. Similarly, a counter 24 counts output pulses of the start/stop oscillator 20 and supplies a counted value to a comparator 25. The comparator 25 determines through comparison whether or not the counted value from the counter 24 corresponds to a value within a range from 15.5 msec to 17.5 msec when the video signal has the field frequency of 60 Hz (or a range from 19 msec to 21 msec when the video signal has the field frequency of 50 Hz), and produces a high-level signal when the counted value corresponds to the value within the range from 15.5 msec to 17.5 msec (or 19 msec to 21 msec). The output signals of the comparators 23 and 25 are supplied to respective data input terminals D of flip-flops 26 and 27, respectively.

The timing generator 21 generates from the vertical synchronizing signal a supplied thereto first through fourth pulse signals b through e shown in FIGS. 4(B) through 4(E), respectively. The timing generator 21 may be realized by known circuits to generate the first through fourth pulse signals with the timings shown in FIGS. 4(B) through 4(E). The first pulse signal b comprises pulses which occur within the time period T1, and for example, the pulses occur a time T1/2 after a rise in the vertical synchronizing signal a. This first pulse signal b is supplied to a reset terminal R of the counter 22, so that the counter 22 is reset during the time period T1 and counts the output pulses of the start/stop oscillator 18 during the time period T2. The second pulse signal c comprises pulses which occur within the time period T2, and for example, the pulses occur a time T2/2 after a fall in the vertical synchronizing signal a. This second pulse signal c is supplied to a reset terminal R of the counter 24, so that the counter 24 is reset during the time period T2 and counts the output pulses of the start/stop oscillator 20 during the time period T1.

The third pulse signal d comprises pulses which occur between the rise in the vertical synchronizing signal a and the pulse of the first pulse signal b, and for example, the pulses of the third pulse signal d occur a time T1/4 after the rise in the vertical synchronizing signal a. The third pulse signal d is supplied to a clock terminal CLK of the flip-flop 26, so that the output signal of the comparator 23 immediately before the counter 22 is reset is obtained from the flip-flop 26. The fourth pulse signal e comprises pulses which occur between the fall in the vertical synchronizing signal a and the pulse of the second pulse signal c, and for example, the pulses of the fourth pulse signal e occur a time T2/4 after the fall in the vertical synchronizing signal a. The fourth pulse signal e is supplied to a clock terminal CLK of the flip-flop 27, so that the output signal of the comparator 25 immediately before the counter 24 is reset is obtained from the flip-flop 27.

The output signals of the flip-flops 26 and 27 are supplied to an AND circuit 28, and an output signal of the AND circuit 28 is produced via an output terminal 29 as the output discrimination signal of the video signal discriminating apparatus.

In FIG. 3, the vertical synchronizing signal separating circuit 17, the start/stop oscillator 18 and the counter 22 correspond to the pulse width measuring means 12 shown in FIG. 1. Similarly, the vertical synchronizing signal separating circuit 17, the start/stop oscillator 20 and the counter 24 correspond to the period measuring means 13 shown in FIG.1. The comparators 23 and 25, the flip-flops 26 and 27, and the AND circuit 28 correspond to the discriminating means 14 shown in FIG. 1. For convenience' sake, the timing generator 21 which controls the operating timing may be considered as being a part of the discriminating means 14. In the case where the pulse width and the period of the horizontal synchronizing signal are to be discriminated, a known horizontal synchronizing signal separating circuit (not shown) should be used instead of the vertical synchronizing signal separating circuit 17, and appropriate changes should be made in the oscillation frequencies and the comparing ranges.

FIG. 5 shows a second embodiment of the video signal discriminating apparatus according to the present invention. The composite synchronizing signal shown in FIG. 2 is applied to an input terminal 31 and is supplied to a counting terminal 34a of a discriminating device 34. The composite synchronizing signal has a constant high level when the video signal does not exist. A switch 32 is connected to a terminal p when the video signal has the field frequency of 60 Hz, and is connected to a terminal q when the video signal has the field frequency of 50 Hz. The terminal p is coupled to a power source voltage Vcc, and the terminal q is grounded.

Hence, an output field frequency indication signal of the switch 32 has a high level when the field frequency of the video signal is 60 Hz and has a low level when the field frequency of the video signal is 50 Hz. The field frequency indication signal generated from the switch 32 is supplied to a discriminating terminal 34b of the discriminating device 34. The discriminating device 34 discriminates the pulse width and the period of the vertical synchronizing pulse within the composite synchronizing signal, and produces a high-level discrimination signal when it is discriminated that the video signal exists and produces a low-level discrimination signal when it is discriminated that no video signal exists. The discrimination signal is outputted via an output terminal 35.

Figure 6:
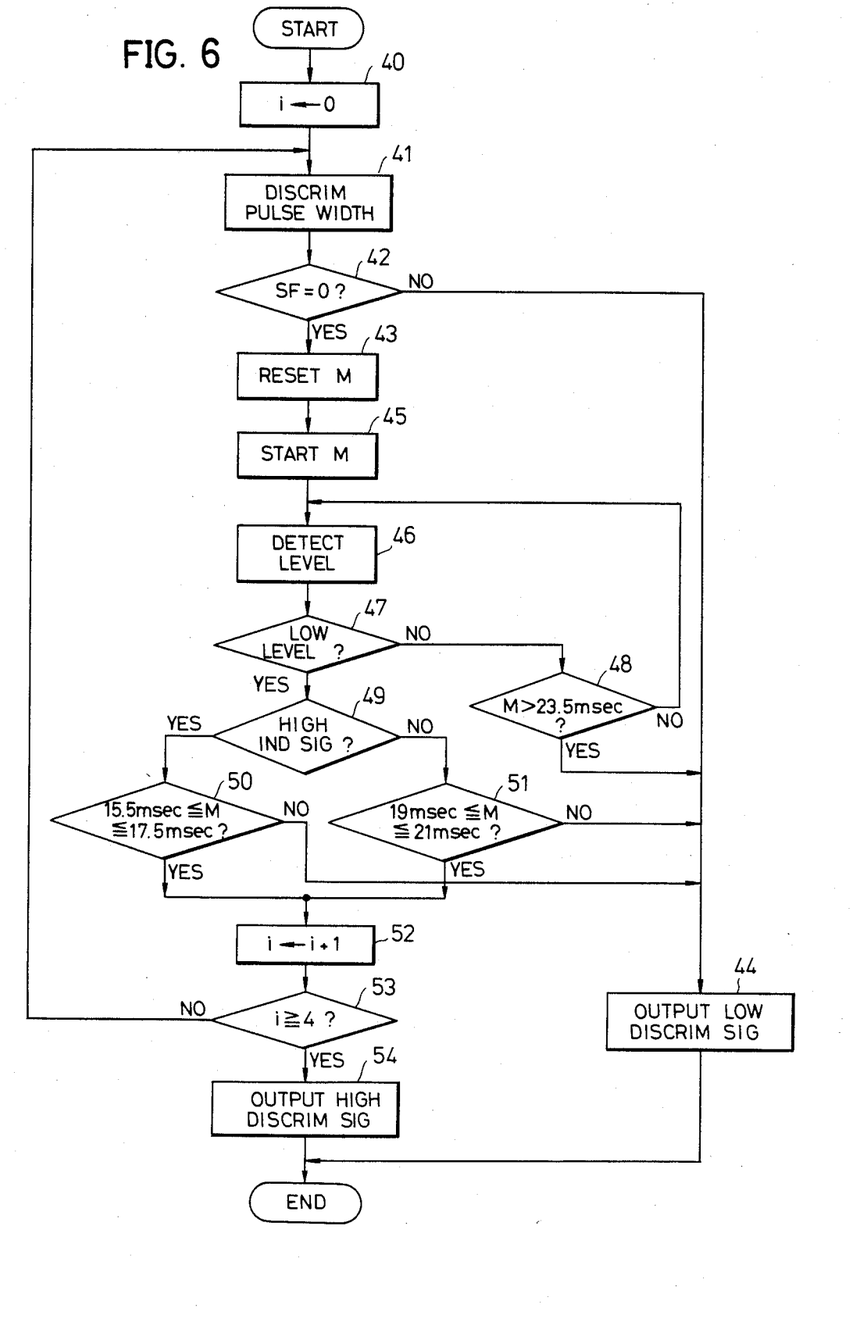
FIGS. 6 and 7 are flow charts for explaining an embodiment of the operation of a microcomputer when the microcomputer is used for a discriminating apparatus shown in FIG. 5.

For example, the discriminating device 34 is constituted by a microcomputer, and decription will now be given with respect to a first embodiment of the operation of the microcomputer constituting the discriminating device 34 by referring to FIGS. 6 and 7. In FIG. 6., a step 40 sets a variable i to a decimal value "0". A step 41 detects the pulse width of the vertical synchronizing pulse within the composite synchronizing signal obtained from the input terminal 31.

The operation of the step 41 will be described in conjunction with FIG. 7. A step 60 detects the level of the composite synchronizing signal by sampling the composite synchronizing signal two times with a sampling interval of 6 μsec, for example, so that the sampling interval is long compared to the pulse width (low-level period) of the horizontal synchronizing pulse. A step 62 discriminates whether or not th e detected level in the step 61 is high for the two times. When the detected level is low for at least one of the two times, the discrimination result in the step 61 is NO and the operation returns to the step 60. It is discriminated that the detected level is high only when the detected level in the step 61 is high for the two times, and the horizontal synchronizing pulse will not be erroneously detected as the vertical synchronizing pulse. The operation advances to a step 62 only when the discrimination result in the step 61 becomes YES. The step 62 resets internal timers M and N of the microcomputer to zero. A step 63 starts the timer M. The timer M counts up for every 500 μsec, for example, and measures a time T1 between times t0 and t1 in the vertical synchronizing signal shown in FIG. 7.

A step 64 again detects the level of the composite synchronizing signal. The step 64 detects the level similarly as the step 60 described before by sampling the composite synchronizing signal two times with a sampling interval of 6 μsec, for example, so that the sampling interval is long compared to the low-level period of the horizontal synchronizing signal. A step 65 discriminates whether or not the detected level in the step 64 is low for the two times. When the detected level is high for at least one of the two times, the discrimination result in the step 65 is NO and the operation advances to a step 66. It is discriminated that the detected level is low only when the detected level in the step 64 is low for the two times. The operation advances to a step 67 only when the discrimination result in the step 65 becomes YES. The step 66 discriminates whether or not the level of the field frequency indication signal is high. When the discrimination result in the step 66 is YES, a step 68 discriminates whether or not a counted value in the timer M is greater than a value corresponding to a period of 16.7 msec for the field frequency of 60 Hz. On the other hand, when the discrimination result in the step 66 is NO, a step 69 discriminates whether or not the counted value in the timer M is greater than a value corresponding to a period of 20 msec for the field frequency of 50 Hz. When the discrimination result in the step 68 or 69 is NO, the operation returns to the step 64. But when the discrimination result in the step 68 or 69 is YES, it is discriminated that the vertical synchronizing pulses do not exist, and the operation advances to a step 70. The step 70 sets a status flag SF to "1", and the operation advances to a step 42 shown in FIG. 6.

The step 67 starts the timer N. The timer N counts up for every 10 μsec, for example, and measures a time T2 between times t1 and t2 in FIG. 6. In other words, the timer N measures the pulse width of the vertical synchronizing pulse. A step 71 detects the level of the composite synchronizing signal similarly as the step 60 described before by sampling the composite synchronizing signal two times with a sampling interval of 6 μsec, for example, so that the sampling interval is long compared to the low-level period of the horizontal synchronizing signal. A step 72 discriminates whether or not the detected level in the step 71 is high for the two times. When the detected level is low for at least one of the two times, the discrimination result in the step 72 is NO and the operation returns to the step 71. It is discriminated that the detected level is high only when the detected level in the step 72 is high for the two times. When the discrimination result in the step 72 is YES, a step 73 discriminates whether or not a counted value in the timer N corresponds to a value within a range from 150 μsec to 200 μsec including the pulse width (three horizontal scanning periods or 180 μsec) of the vertical synchronizing pulse. The operation advances to the step 70 when the discrimination result in the step 73 is NO. On the other hand, a step 74 resets the status flag SF to "0" when the discrimination result in the step 73 is YES. The operation advances to the step 42 shown in FIG. 6 after the step 74 is carried out.

Returning now to the description of the steps shown in FIG. 6, the step 42 discriminates whether or not the status flag SF is "0" after carrying out the step 41 in which the pulse width is detected. A step 43 resets the timer M to zero to start the operation of measuring the period of the vertical synchronizing pulse when the discrimination result in the step 42 is YES. On the other hand, a step 44 outputs a discrimination signal having a value "0" (that is, low level) when the discrimination result in the step 42 is NO, and the operation of the microcomputer is ended. After the step 43 is carried out, a step 45 starts the timer M. A step 46 detects the level of the composite synchronizing signal. The step 46 detects the level similarly as the step 60 described before by sampling the composite synchronizing signal two times with a sampling interval of 6 μsec, for example, so that the sampling interval is long compared to the low-level period of the horizontal synchronizing signal. A step 47 discriminates whether or not the detected level in the step 46 is low for the two times. When the detected level is high for at least one of the two times, the discrimination result in the step 47 is NO and the operation advances to a step 48. It is discriminated that the detected level is low only when the detected level in the step 47 is low for the two times. The operation advances to a step 49 only when the discrimination result in the step 47 becomes YES. The step 48 discriminates whether or not the counted value in the timer M is greater than a value corresponding to a time period of 23.5 msec which is sufficiently long compared to the period (20 msec) of the vertical synchronizing pulse. The operation returns to the step 46 when the discrimination result in the step 48 is NO. On the other hand, when the discrimination result in the step 48 is YES, it is discriminated that no vertical synchronizing pulse is detected, and the operation advances to the step 44 described before.

The step 49 discriminates whether or not the field frequency indication signal has a high level. A step 50 discriminates whether or not the counted value in the timer M corresponds to a value within a range of 15.5 msec to 17.5 msec including error in the period of 16.7 msec for the field frequency of 60 Hz. The operation advances to the step 44 when the discrimination result in the step 50 is NO. On the other hand, a step 51 discriminates whether or not the counted value in the timer M corresponds to a value within a range of 19 msec to 21 msec including error in the period of 20 msec for the field frequency of 50 Hz. The operation advances to the step 44 when the discrimination result in the step 51 is NO. A step 52 increments the variable i by one when the discrimination result in the step 50 or 51 is YES. A step 53 discriminates whether or not the variable i is greater than or equal to four. The steps 41 through 52 are repeated when the discrimination result in the step 53 is NO. When the discrimination result in the step 50 or 51 is YES repeatedly for four times, the discrimination result in the step 53 becomes YES, and a step 54 outputs a discrimination signal having a value "1" (that is, high level). The operation of the microcomputer is ended after the step 54 is carried out.

Figure 7:
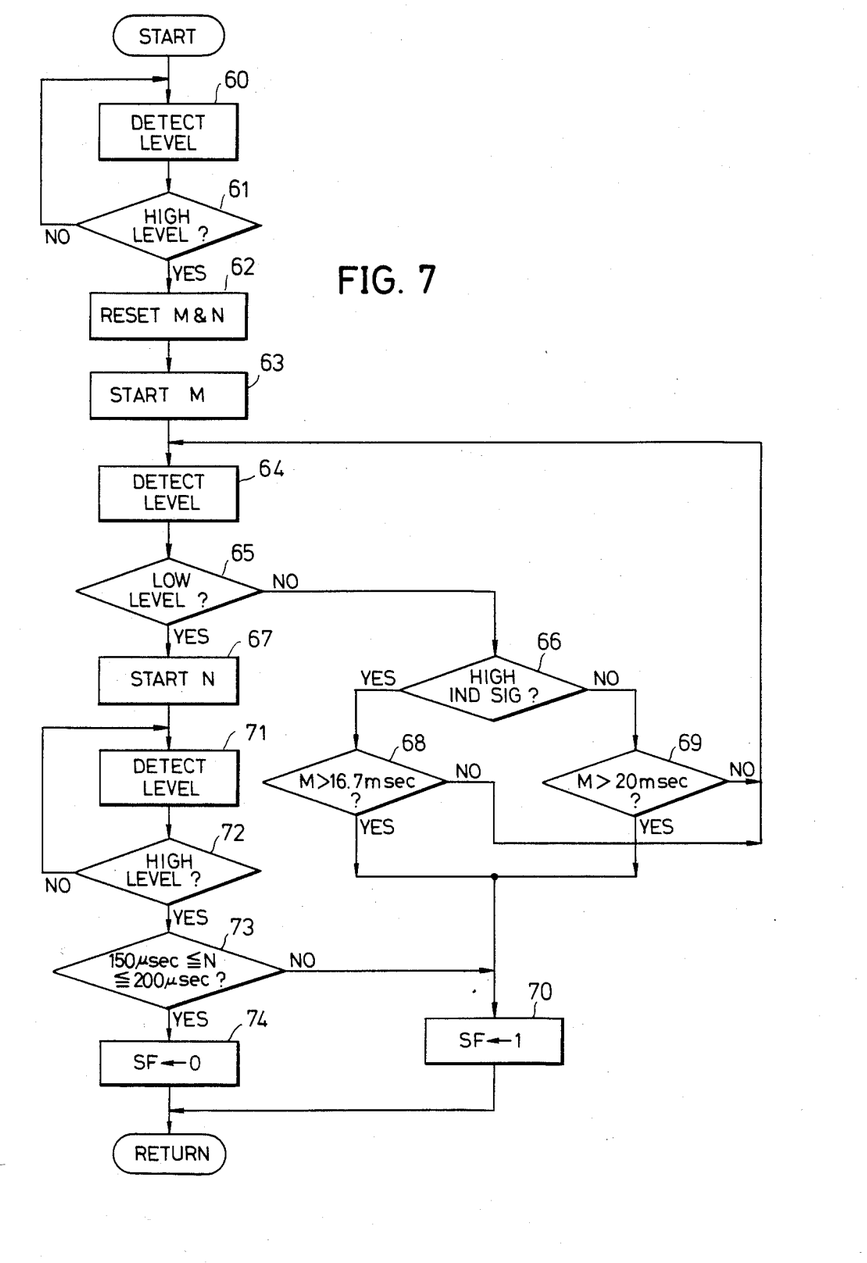

Therefore, the pulse width of the vertical synchronizing pulse in the vertical synchronizing signal is detected by the steps 62 through 74 shown in FIG. 7 (the step 41 shown in FIG. 6), and the period of the vertical synchronizing signal is detected by the steps 43 and 45 through 53 shown in FIG. 6. The discriminating device 34 discriminates whether or not the video signal exists based on the detected pulse width of the vertical synchronizing signal and the detected period of the vertical synchronizing signal. For this reason, the existence of the video signal can be discriminated with an improved accuracy compared to the conventional video signal discriminating circuit. In addition, since the level detection is carried out based on the levels which are detected two times with a predetermined sampling interval in the steps 47, 61, 65, and 72, it is possible to discriminate the existence of the video signal with a high accuracy even when the signal-to-noise ratio of the video signal becomes deteriorated. Furthermore, the discrimination can be carried out by use of only the composite synchronizing signal separated from the video signal, and it is unnecessary to use a sub video signal as in the case of the conventional video signal discriminating circuit. In the present embodiment, the number of times the steps 42 through 52 are repeated is four, but the number of times the steps 42 through 52 are repeated is not limited to four.

Figure 9:
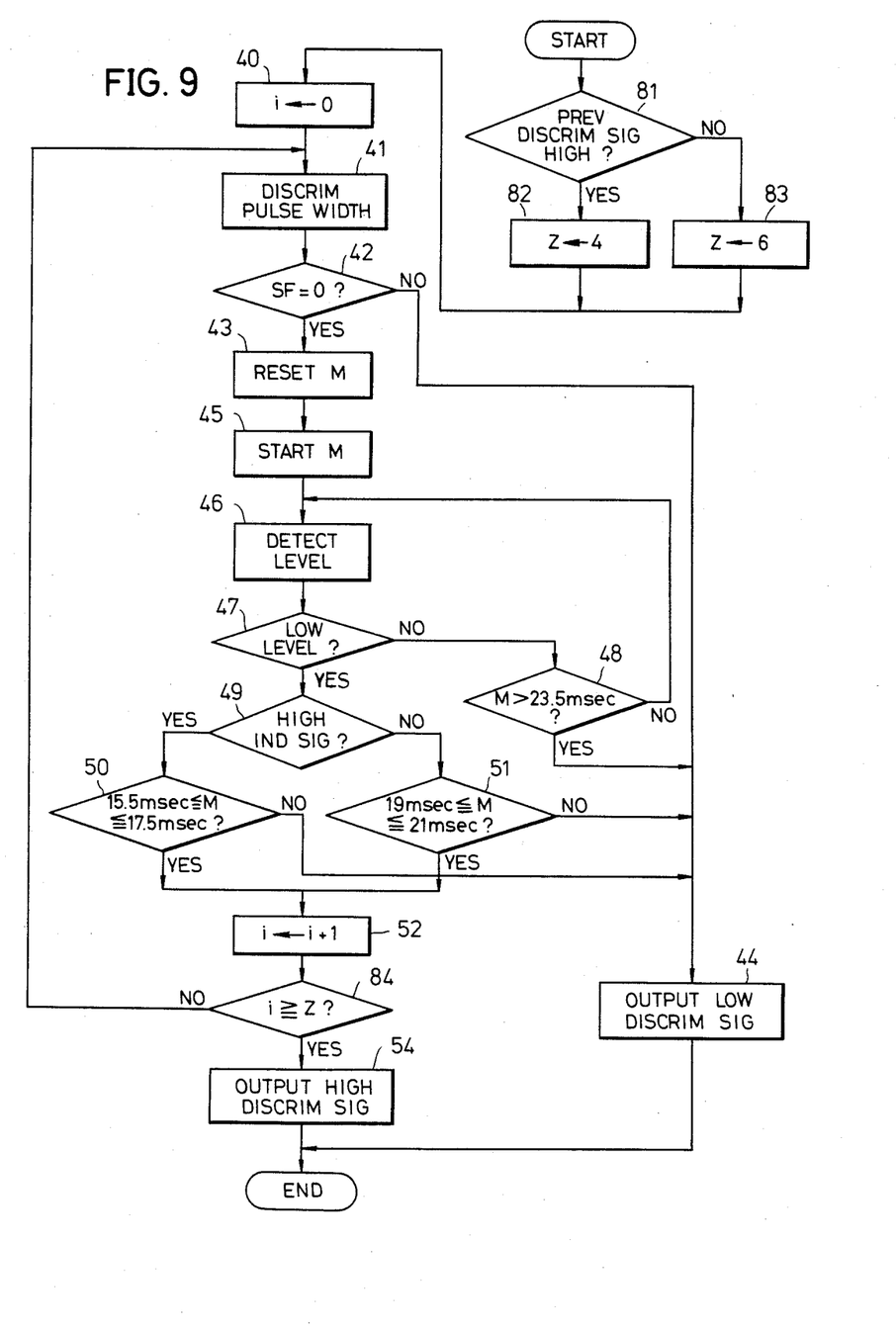
FIG. 9 is a flow chart for explaining another embodiment of the operation of the microcomputer.

Next, description will be given with respect to a second embodiment of the operation of the microcomputer by referring to FIG. 9. In FIG. 9, those parts which are the same as those corresponding parts in FIG. 6 are designated by the same reference numerals, and description thereof will be omitted. A step 81 discriminates whether or not the value of the previous discrimination signal outputted from the discriminating device (microcomputer) 34 is "1" (high). When the discrimination result in the step 81 is YES, a step 82 sets a reference value Z to a value "4". On the other hand, a step 83 sets the reference value Z to a value "6" when the discrimination result in the step 81 is NO. The operation advances to the step 40 described before in conjunction with FIG. 6 after the step 82 or 83 is carried out.

The operations carried out by the steps 40 through 52 are the same as those described before in conjunction with FIGS. 6 and 7.

After the step 52 is carried out, a step 84 discriminates whether or not the variable i is greater than or equal to the reference value Z. The operation returns to the step 41 when the discrimination result in the step 84 is NO. On the other hand, the operation advances to the step 54 when the discrimination result in the step 84 is YES. In the present embodiment, the operation advances to the step 54 when the discrimination result in the step 50 or 51 is YES repeatedly for Z times.

The number (the value of the variable i) of times the loop constituted by the steps 41 through 42 and 84 is carried out in order to stabilize the discriminating operation is determined depending on the stability of the output discrimination signal and the response of the discrimination. Depending on the state of the video signal reception, a hunting phenomenon occurs when the discriminated pulse width is in the vicinity of 180 μsec and when the discriminated period is in the vicinity of 10.7 (or 20) msec. For example, when only a weak video signal is obtainable, the video signal discriminating apparatus may discriminate that the video signal exists for a certain instant and then discriminate that no video signal exists at another instant. For this reason, the reference value Z is used in the present embodiment to prevent such an inconvenience from occurring.

In other words, when it is previously discriminated that the video signal exists, the reference value Z is reduced to a value a1 (a1 is a natural number and is equal to "4" in the present embodiment) so as to make the discrimination less strict. On the other hand, when it is previously discriminated that no video signal exists, the reference value Z is increased to a value a2 (a2 is a natural number greater than a1 and is equal to "6" in the present embodiment) so as to make the discrimination more strict. By changing the reference value Z in this manner, it becomes possible to stably discriminate the existence of the video signal with a high accuracy regardless of the state of the video signal reception. In the steps 82 and 83 shown in FIG. 9, it is of course possible to set the reference value Z to values other than "4" and "6", respectively.

Therefore, the pulse width of the vertical synchronizing pulses in the vertical synchronizing signal is detected by the step 41 shown in FIG. 9, and the period of the vertical synchronizing signal is detected by the steps 43 and 45 through 53 shown in FIG. 9. The discriminating device 34 discriminates whether or not the video signal exists based on the detected pulse width of the vertical synchronizing signal and the detected period of the vertical synchronizing signal. For this reason, the existence of the video signal can be discriminated with an improved accuracy compared to the conventional video signal discriminating circuit. In addition, since the level detection is carried out based on the levels which are detected two times with a predetermined sampling interval in the steps 47, 61, 65, and 72, it is possible to discriminate the existence of the video signal with a high accuracy even when the signal-to-noise ratio of the video signal becomes deteriorated. Furthermore, the discrimination can be carried out by use of only the composite synchronizing signal separated from the video signal, and it is unnecessary to use a sub video signal as in the case of the conventional video signal discriminating circuit.

In the first and second embodiments of the operation of the microcomputer described heretofore, the existence of the video signal is discriminated by discriminating the pulse width and the period of the vertical synchronizing pulse within the composite synchronizing signal. However, it is possible to discriminate the existence of the video signal in a similar manner by discriminating the pulse width and the period of the horizontal synchronizing pulse within the composite synchronizing signal. In this case, the level detection in the steps 47, 61, 65 and 74 should be carried out two times with a predetermined sampling interval selected to a time period in the order of 1 μsec which is sufficiently short compared to the pulse width (4 μsec) of the horizontal synchronizing pulse.

Furthermore, instead of using the internal timers M and N, it is possible to count the number of executed steps by assuming that the execution times of the steps are the same.

Moreover, it is assumed in the embodiments that the either one of the video signal having the field frequency of 50 Hz or the video signal having the field of 60 Hz may be received. However, in the case where only one kind of video signal is received, there is no need to supply the field frequency indication signal to the discriminating device 34 and the switch 32 may be omitted in this case. In addition, the steps shown in FIGS. 6, 7 and 9 related to the field frequency indication signal may be omitted.

As may be understood from the description given heretofore, the video signal discriminating apparatus according to the present invention is especially suited for use in a video signal superimposing circuit which superimposes a sub video signal on a main video signal. In this case, it becomes possible to accurately and stably discriminate whether or not the main video signal exists by use of the video signal discriminating apparatus.

Further, the present invention is not limited to these embodiments, but various variations and modifications may be made without departing from the scope of the present invention.

What is claimed is:

1. A video signal discriminating apparatus comprising:
    first means supplied with a composite synchronizing signal of a video signal for measuring a pulse width of one of a vertical synchronizing signal and a horizontal synchronizing signal of the composite synchronizing signal, and for producing a measured pulse width;
    second means supplied with the composite synchronizing signal for measuring a period of said one of the vertical synchronizing signal and the horizontal synchronizing signal having the pulse width thereof measured by said first means, and for producing a measured period; and
    third means supplied with the measured pulse width and the measured period for discriminating whether or not the measured pulse width and the measured period respectively are within first and second predetermined ranges, said third means producing a discrimination signal indicating that the video signal exists only when the measured pulse width and the measured period are respectively within said first and second predetermined ranges.

2. A video signal discriminating apparatus as claimed in claim 1 in which said first means measures the pulse width of the vertical synchronizing signal and said second means measures the period of the vertical synchronizing signal.

3. A video signal discriminating apparatus as claimed in claim 1 in which said first means measures the pulse width of the horizontal synchronizing signal and said second means measures the period of the horizontal synchronizing signal.

4. A video signal discriminating apparatus as claimed in claim 1 in which said first means comprises a first oscillator which starts and stops an oscillation responsive to first and second transitions in said one of the vertical synchronizing signal and the horizontal synchronizing signal and a first counter for counting output pulses of said first oscillator, said second means comprises a second oscillator which starts and stops an oscillation responsive to the second and first transitions in said one of the vertical synchronizing signal and the horizontal synchronizing signal and a second counter for counting output pulses of said second oscillator, and said third means comprises a first comparator supplied with a counted value in said first counter for determining whether or not the counted value is within a first range, a second comparator supplied with a counted value in said second counter for determining whether or not the counted value is within a second range and a logic circuit responsive to output signals of said first and second comparators for producing a discrimination signal which indicates that the video signal exists when the counted values in said first and second counters are respectively within said first and second ranges.

5. A video signal discriminating apparatus as claimed in claim 4 in which said first counter counts the output pulses of said first oscillator during a first time period in which said one of the vertical synchronizing signal and the horizontal synchronizing signal has a first level and said second counter counts the output pulses of said second oscillator during a second time period in which said one of the vertical synchronizing signal and the horizontal synchronizing signal has a second level.

6. A video signal discriminating apparatus as claimed in claim 5 which further comprises timing generating means for generating first through fourth controls signals, said first counter being reset by said first control signal during said second time period, said second counter being reset by said second control signal during said first time period, said logic circuit being responsive to said third and fourth control signals and comprising an AND circuit for producing a discrimination signal by performing an AND operation between the output signals of said first and second comparators received immediately before said first and second counters are reset by said first and second control signals.

7. A video signal discriminating apparatus as claimed in claim 1 in which said first and second means respectively measure the pulse width and the period of the vertical synchronizing signal by detecting a level of the composite synchronizing signal a plurality of times with a sampling interval longer than a pulse width of the horizontal synchronizing signal.

8. A video signal discriminating apparatus as claimed in claim 1 in which said first and second means respectively measure the pulse width and the period of the horizontal synchronizing signal by detecting a level of the composite synchronizing signal a plurality of times with a sampling interval shorter than a pulse width of the horizontal synchronizing signal.

9. A video signal discriminating apparatus as claimed in claim 1 in which said third means produces a discrimination signal indicating that the video signal exists only when the measured pulse width and the measured period are respectively within said first and second predetermined ranges for Z successive measurements, where Z is an integer greater than one.

10. A video signal discriminating apparatus as claimed in claim 9 in which said integer Z is variable.

11. A video signal discriminating apparatus as claimed in claim 10 in which said integer Z is selected to a first value when a previous discrimination signal produced by said third means indicates that the video signal exists and said integer Z is selected to a second value when a previous discrimination signal produced by said third means indicates that no video signal exists, said first value being smaller than said second value.

12. A video signal discriminating apparatus as claimed in claim 1 which further comprises means for discriminating a field frequency of the video signal, said second predetermined range being set depending on the field frequency of the video signal.

* * * * *